(No Model.) 3 Sheets—Sheet 1.
G. E. CLARKE.
BRAKE LOCK.
No. 257,291. Patented May 2, 1882.
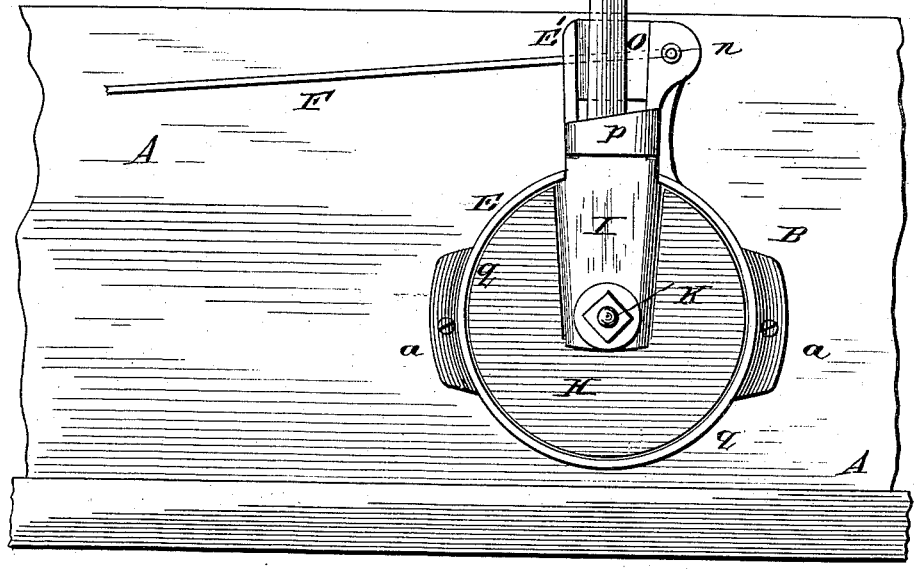
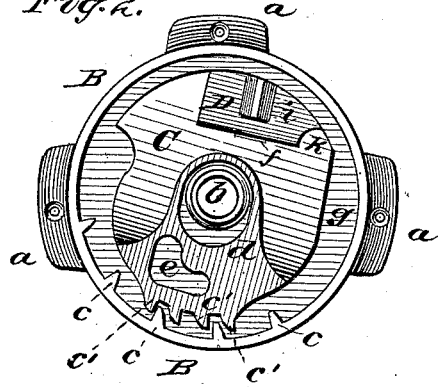
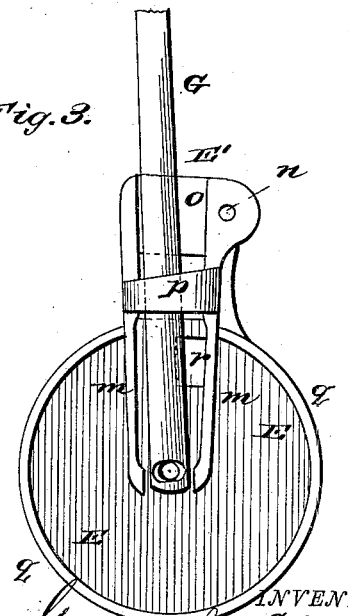
WITNESSES
Fred. G. Dieterich.
P. C. Dieterich.
INVENTOR
Greville E. Clarke,
by Louis Bagger & Co.
Attorneys
N. PETERS. Photo-Lithographer, Washington, D. C.

(No Model.) 3 Sheets—Sheet 2.

G. E. CLARKE.
BRAKE LOCK.

No. 257,291. Patented May 2, 1882.

WITNESSES
Fred. G. Dieterich.
P. C. Dieterich.

Greville E. Clarke,
INVENTOR,
by Louis Bagger & Co.
his Attorneys (No Model.) 3 Sheets—Sheet 3.

G. E. CLARKE.
BRAKE LOCK.

No. 257,291. Patented May 2, 1882.

WITNESSES
Fred. G. Dieterich.
P. C. Dieterich.

Greville E. Clarke,
INVENTOR,
by Louis Bagger & Co.
Attorneys

UNITED STATES PATENT OFFICE.

GREVILLE E. CLARKE, OF RACINE, WISCONSIN.

BRAKE-LOCK.

SPECIFICATION forming part of Letters Patent No. 257,291, dated May 2, 1882.

Application filed January 10, 1882. (No model.)

*To all whom it may concern:*

Be it known that I, GREVILLE E. CLARKE, of Racine, in the county of Racine and State of Wisconsin, have invented certain new and useful Improvements in Brake-Locks; and I do hereby declare that the following is a full, clear, and exact description thereof, which will enable others skilled in the art to which it appertains to make and use the same, reference being had to the accompanying drawings, which form a part of this specification, and in which—

Figure 4:
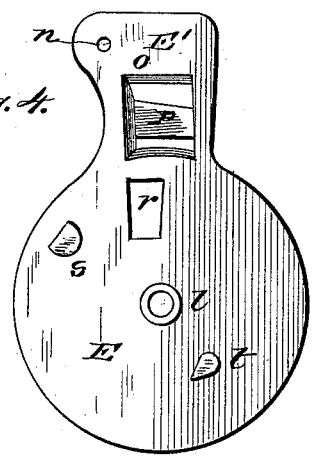
Figure 5:
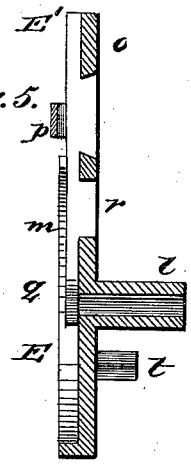
Figure 6:
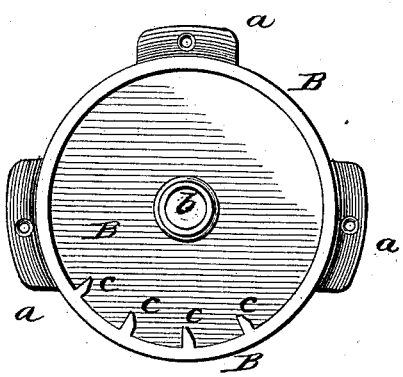
Figure 7:
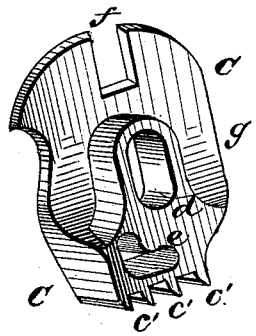
Figure 8:
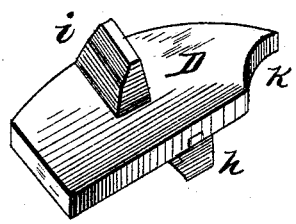
Figure 9:
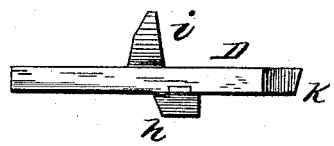
Figure 11:
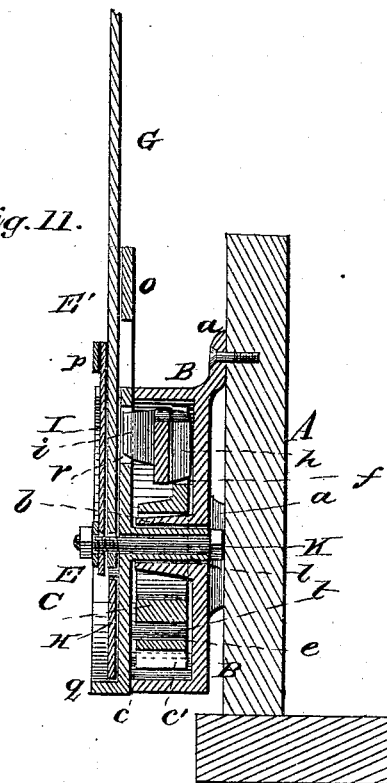
Figure 10:
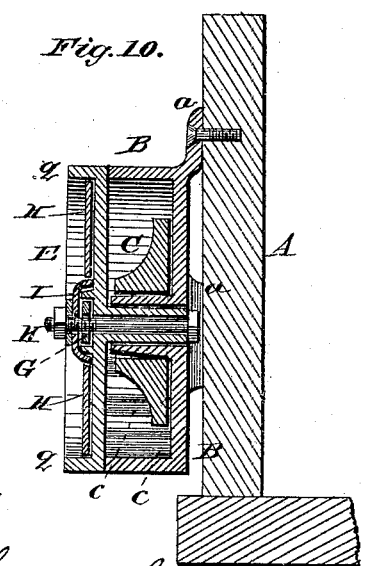

Figure 1 is a side elevation of part of a wagon-box which is provided with my improved brake-lock. Fig. 2 is a plan view of the brake-lock with its face-plate removed. Fig. 3 is a plan of the face-plate and lever, the housing-plates having been removed. Fig. 4 is a plan of the opposite or inner side of the face-plate. Fig. 5 is a longitudinal section through the center of the face-plate. Fig. 6 is a plan of the circular base-plate or lock-casing. Fig. 7 is a perspective view of the movable ratchet or lock plate detached. Fig. 8 is a perspective view of the tumbler for locking and unlocking the ratchet-plate. Fig. 9 is an edge view of the same. Fig. 10 is a sectional view through the center of the entire device, showing the parts in the position for releasing the brakes; and Fig. 11 is a similar view, showing the parts in position for "setting" and locking the brakes.

Similar letters of reference indicate corresponding parts in all the figures.

My invention has relation to devices or appliances for setting and locking the brakes of a vehicle; and it consists in the construction and combination of parts of an automatic brake-locking device so arranged that by pushing the lever in a forward direction the brakes are set and locked, while by pushing it straight backward in a plane with its forward motion they are unlocked and released.

The object of my invention is to construct an automatic brake-lock which may be set and released without lateral motion of the operating-lever, which shall be strong and durable in construction, and have all its operating parts housed in such a manner that they shall be covered and protected against mud, dust, and water, thus enabling them to wear much longer and to be operated with greater ease than where they are exposed, as is usually the case in this class of devices.

In the three sheets of drawings hereto annexed, the letter A denotes a portion of a wagon box or body, which may be of any desired shape and construction.

B is the base-plate or lock-casing, within which all the operating parts of my device, except the lever, are contained. It consists of a cylindrical box of cast-iron having projecting lugs $a$, by means of which it is bolted upon the wagon-box. It also has a central hub, $b$, projecting inwardly from the bottom, and a series of inwardly-projecting teeth, $c$, cast upon the lower part of its rim.

C is the ratchet-plate or lock-plate, having an oblong hole, $d$, in the center, through which is inserted the hub $b$ of the base-plate. It is provided with a series of teeth, $c'$, a curved slot, $e$, located between said teeth and the central opening, and has an open slot or cut, $f$, at the upper end, one side of which is made beveled. On one side the plate is cut away so as to form a stop or shoulder, $g$.

D is the tumbler or releasing device, which consists of a flat plate having a beveled boss, $h$, on one side, and a projecting lug or rib, $i$, with beveled sides on the opposite side. The upper part of this tumbler is rounded to fit the circular rim of the base-plates upon which it slides, its smallest end being concaved, as shown at $k$, to fit the stud on the face-plate, as hereinafter described.

E is the face-plate, which is of circular shape and of the same diameter as the base-plate or casing B, for which it forms a movable cover. It has a central hub, $l$, which fits into the hub of the base-plate, and is cast with a projection, E', having ribs $m\ m$, which extend down to the center, gradually diverging so as to increase the space between them from the center outward. The extension or projecting part E' has an eye, $n$, for the attachment of the brake-rod F, and two keepers or guide-plates, $o$ and $p$, between which lever G moves, the ribs $m\ m$ limiting the play of the lever forward and back. Plate E also has a circular rim or flange, $q$, on the outside, which is broken by the intersection of the side flanges, $m$, a slot or opening, $r$, in the space between said flanges or ribs, and two studs, s and t, on its inner face, the upper one, s, of which is of such shape as to fit against the concave shoulder k of tumbler D, while the lower one, t, is of such shape as to fit into and work loosely in the curved slot e in the ratchet-plate C.

H and I are the housing-plates, one of which, H, is of circular shape to fit and cover the outside of face-plate E within its rim or flange, and is cut away to make room for the ribs m m. These ribs, with that part of lever G that projects down between them, are covered and protected by the other housing-plate, I, which has a hole at its lower end to receive the headed and nutted bolt K, which is inserted through the central hub, l, of the face-plate, and keeps the several parts together. The housing-plate H is not necessary, and may be dispensed with, if desired.

By reference to the foregoing description, taken in connection with the drawings, the operation of my invention will readily be understood. It will be seen that the beveled boss h of tumbler D projects into the beveled slot f in the top part of ratchet-plate C, while its beveled rib or stud i projects out through the aperture r in the face-plate E, so as to impinge on one side upon the forward edge of lever G, and on the other side upon the contiguous rib m. Thus when the lever G is forced in a forward direction from its perpendicular position to set the brakes it will, before turning the face-plate, move in the space between the two flanges m m, and by striking against the beveled stud of tumbler D force it out of the aperture r, through which it projects, causing the boss h of the tumbler to enter and engage with the slot f in ratchet-plate C, the bevel of the boss sliding down along the bevel of the slot. The next motion forward of the lever operates to turn the face-plate E, the stud t of which, working in the curved slot e of ratchet-plate C, will raise the latter upon the hub b on which it rides, and thus enable its teeth c' to pass the teeth c of base-plate B without engaging with them. The brakes having been set with the requisite degree of tension, the operator lets go his hold of the lever, when the backward tension or pressure will turn face-plate E in the reverse direction just enough to cause its stud t to turn the ratchet-plate C down against the bottom part of the base-plate, so that the two sets of teeth or ratchets c' and c will interlock and prevent any further backward motion of the ratchet-plate or face-plate, thus keeping the brakes firmly locked in their set position.

To unlock and release the brakes all that is necessary is to push lever G back against the rearward flange m. This motion again uncovers the aperture r in the face-plate and permits tumbler D to fly back into its original position, thus releasing its boss h from the slot f in ratchet-plate C. The next motion of the lever operates to turn the face-plate back or to reverse it, and its stud t, playing in the slot e and now entering the opposite arm of its curve, lifts plate C upon its hub, so as to disengage the intermeshing ratchets c' and c, and plates E and C will fly back until stopped by the shoulder g of the ratchet-plate striking against the rearmost or uppermost of the teeth c in the base-plate, which serves as a stop.

Having thus described my invention, I claim and desire to secure by Letters Patent of the United States—

1. The cylindrical base-plate or casing B, having exterior lugs, a, interior hub, b, and ratchet-teeth c, substantially as set forth.

2. The ratchet-plate or lock-plate C, having an oblong center, d, curved slot e, beveled slot f, and stop or shoulder g, and provided with a set or series of ratchet-teeth, c', substantially as shown and set forth.

3. The tumbler D, consisting of a curved plate having the beveled boss h, beveled rib i, and concave shoulder k, substantially as set forth.

4. The face-plate E, cast with the extension E', having guide-plates o and p, eye n for the attachment of the brake-rod, and flanges or ribs m m, intersecting the annular rim or flange q, and provided with the slot or aperture r, studs s t, and central tubular hub or pintle, l, substantially as shown and set forth.

5. The combination of the flanged face-plate E, constructed as described, central bolt, K, lever G, and housing-plate I, as set forth.

6. The combination of the base-plate or casing B, constructed as described, ratchet-plate C, tumbler D, face-plate E, lever G, and bolt K, all constructed and combined to operate substantially in the manner and for the purpose herein shown and specified.

7. The combination, with the base-plate B, having the stationary inside ratchet, c, and the adjustable ratchet-plate C, adapted to engage with said ratchet, of the tumbler D, actuated by lever G to interlock with the ratchet plate, substantially as and for the purpose herein shown and set forth.

In testimony that I claim the foregoing as my own I have hereunto affixed my signature in presence of two witnesses.

GREVILLE E. CLARKE.

Witnesses:
GEO. SKEWES,
GEO. A. WEST.